US012188793B2

United States Patent
Li et al.

(10) Patent No.: US 12,188,793 B2
(45) Date of Patent: Jan. 7, 2025

(54) HETERODYNE TWO-DIMENSIONAL GRATING MEASURING DEVICE AND MEASURING METHOD THEREOF

(71) Applicant: CHANGCHUN INSTITUTE OF OPTICS, FINE MECHANICS AND PHYSICS, ACADEMY OF SCIENCES, Changchun (CN)

(72) Inventors: Wenhao Li, Changchun (CN); Zhaowu Liu, Changchun (CN); Hongzhu Yu, Changchun (CN); Wei Wang, Changchun (CN); Rigalantu Ji, Changchun (CN); Xuefeng Yao, Changchun (CN)

(73) Assignee: CHANGCHUN INSTITUTE OF OPTICS, FINE MECHANICS AND PHYSICS, ACADEMY OF SCIENCES, Changchun (CN)

( * ) Notice: Subject to any disclaimer, the term of this patent is extended or adjusted under 35 U.S.C. 154(b) by 281 days.

(21) Appl. No.: 17/711,006

(22) Filed: Mar. 31, 2022

(65) Prior Publication Data

US 2022/0228890 A1 Jul. 21, 2022

Related U.S. Application Data

(63) Continuation of application No. PCT/CN2020/128528, filed on Nov. 13, 2020.

(30) Foreign Application Priority Data

Sep. 11, 2020 (CN) .......................... 202010953663.0

(51) Int. Cl.
*G01D 5/26* (2006.01)
*G01B 9/02003* (2022.01)
(Continued)

(52) U.S. Cl.
CPC ......... *G01D 5/266* (2013.01); *G01B 9/02003* (2013.01); *G01B 11/02* (2013.01);
(Continued)

(58) Field of Classification Search
CPC .......... G01D 5/266; G01D 5/38; G01D 5/268; G01B 11/02; G01B 2290/70;
(Continued)

(56) References Cited

U.S. PATENT DOCUMENTS

| 5,369,486 A | * | 11/1994 | Matsumoto | ........... G03F 9/7049 |
| | | | | 356/488 |
| 6,080,990 A | * | 6/2000 | Watanabe | ............. G03F 9/7049 |
| | | | | 250/559.31 |

(Continued)

FOREIGN PATENT DOCUMENTS

| CN | 102353327 A | 2/2012 |
| CN | 102944176 A | 2/2013 |

(Continued)

OTHER PUBLICATIONS

International Search Report issued in corresponding International application No. PCT/CN2020/128528, mailed Jun. 15, 2021.

(Continued)

*Primary Examiner* — Mohamed K Amara
*Assistant Examiner* — Noah J. Haney
(74) *Attorney, Agent, or Firm* — Jeenam Park

(57) ABSTRACT

A heterodyne two-dimensional grating measuring device and measuring method thereof includes a light source, a reading head, a photoelectric receiving module, and a processor. The light source is configured to generate two beams of linearly polarized light having characteristics of overlapping, polarization orthogonal, and fixed frequency difference. The reading head is configured to receive the two beams of the linearly polarized light, the two beams of the (Continued)

linearly polarized light are respectively incident on a surface of a moving two-dimensional measuring grating to generate ±1-order diffracted lights of two dimensions, and the ±1-order diffracted lights are respectively incident to the photoelectric receiving module through the reading head. The photoelectric receiving module is configured to generate beat frequency signals, the processor is configured to perform differential calculation on the beat frequency signals to realize a displacement measurement of measuring grating for four-fold optical subdivision.

16 Claims, 4 Drawing Sheets

(51) Int. Cl.
  *G01B 11/02* (2006.01)
  *G01D 5/38* (2006.01)
  *G02B 26/08* (2006.01)
  *G02B 27/28* (2006.01)
(52) U.S. Cl.
  CPC ............ *G01D 5/38* (2013.01); *G02B 26/0808* (2013.01); *G02B 27/283* (2013.01); *G02B 27/285* (2013.01)
(58) Field of Classification Search
  CPC ............ G01B 9/02003; G02B 26/0808; G02B 27/283; G02B 27/285
  USPC .......................................... 356/487
  See application file for complete search history.

(56) References Cited

U.S. PATENT DOCUMENTS

| | | | |
|---|---|---|---|
| 9,030,661 | B1 | 5/2015 | Mieher et al. |
| 9,097,511 | B2* | 8/2015 | Kuroda ................ G01D 5/38 |
| 10,066,974 | B2* | 9/2018 | Liesener ............... G01D 5/266 |
| 2011/0141451 | A1* | 6/2011 | Yamaguchi ............ G01D 5/38 356/494 |
| 2013/0114061 | A1* | 5/2013 | de Groot ............ G03F 7/70775 355/72 |
| 2015/0160044 | A1* | 6/2015 | Liu ..................... G02B 5/1861 355/72 |
| 2015/0268031 | A1* | 9/2015 | Zhu ........................ G01B 11/14 356/486 |
| 2015/0338205 | A1* | 11/2015 | Zhang ................ G01B 9/02011 356/487 |
| 2016/0153764 | A1* | 6/2016 | Zhu ..................... G01B 9/02027 356/488 |
| 2019/0310072 | A1* | 10/2019 | Wu ....................... G01D 5/266 |

FOREIGN PATENT DOCUMENTS

| | | | | |
|---|---|---|---|---|
| CN | 103604375 A | | 2/2014 | |
| CN | 103759656 A | | 4/2014 | |
| CN | 104634254 A | | 5/2015 | |
| CN | 105823422 B | * | 8/2018 | ............ G01B 11/02 |
| CN | 110007384 A | * | 7/2019 | ............ G02B 5/1857 |
| CN | 110360931 A | * | 10/2019 | ............ G01B 11/02 |

OTHER PUBLICATIONS

Written Opinion of the International Searching Authority for No. PCT/CN2020/128528.

* cited by examiner

HETERODYNE TWO-DIMENSIONAL GRATING MEASURING DEVICE AND MEASURING METHOD THEREOF

CROSS-REFERENCE TO RELATED APPLICATION

The present disclosure claims foreign priority to Chinese Patent Application No. 202010953663.0, titled: HETERODYNE TWO-DIMENSIONAL GRATING MEASURING SYSTEM AND MEASURING METHOD THEREOF, filed on Sep. 11, 2020 in the State Intellectual Property Office of China, and the present disclosure further claims priority to international application No. PCT/CN2020/128528, titled: HETERODYNE GRATING MEASUREMENT DEVICE AND MEASUREMENT METHOD, filed on Nov. 13, 2020, the entire contents of which are hereby incorporated by reference.

TECHNICAL FIELD

The present disclosure relates to a related field of precision displacement measurement, and in particular to a heterodyne two-dimensional grating measuring device and measuring method thereof, based on single diffraction, to realize four-fold optical subdivision.

BACKGROUND

A grating displacement measuring system uses a grating as a measuring scale, and the grating displacement measuring system uses a grating distance of the grating as a measuring reference. Compared with a laser measuring technology, sensitivity of a grating measuring technology to an environment change is low, and light beams are incident on the grating to cover a plurality of etching grooves, so that an averaging effect is achieved. A structure of a reading head in the grating displacement measuring system is simple and compact, a distance between the grating and the reading head is small, and the distance between the grating and the reading head may not increase along with increasing of a measured distance, which greatly reduces environmental influence on measuring accuracy of the system and measuring cost. With improvement of a grating manufacturing level, the measuring accuracy and a measuring resolution of the grating displacement measuring system are gradually improved, and application range is wider and wider.

The measuring resolution of the grating displacement measuring technology is directly related to a period of the grating. The displacement measuring technology based on a diffracted light interference principle adopts a diffraction grating having high density of grating grooves to achieve a high-resolution and high-accuracy displacement measurement. Optical subdivision and electronic subdivision are main ways to further improve the measuring resolution. Compared with the electronic subdivision, the optical subdivision is more reliable. A conventional grating displacement measuring system realizes two-fold optical subdivision through adopting single diffraction. In order to further improve the optical subdivision, prior art adopts a secondary diffraction principle to realize four-fold optical subdivision or a multiple diffraction to achieve higher times of optical subdivision. However, the secondary diffraction and the multiple diffraction make an optical structure of the measuring system more complex, the multiple diffraction uses diffracted lights at different positions of the grating, and a surface accuracy of the grating and an attitude error between the grating and the reading head have a great influence on the measuring accuracy.

SUMMARY

The present disclosure aims to overcome defects in prior art and adopt following technical schemes:

The present disclosure provides a heterodyne two-dimensional grating measuring device, including a light source, a reading head, a photoelectric receiving module, and a signal processing system. The light source is configured to generate two beams of linearly polarized light having characteristics of overlapping, polarization orthogonal, and fixed frequency difference. The two beams of linearly polarized light are a first polarized light and a second polarized light, respectively. The reading head is configured to receive the first polarized light and the second polarized light, the first polarized light and the second polarized light are respectively incident on a surface of a moving two-dimensional measuring grating to generate a first dimension ±1-order diffracted light and a second dimension ±1-order diffracted light, the first dimension ±1-order diffracted light and the second dimension ±1-order diffracted light are respectively incident to the photoelectric receiving module through the reading head. The photoelectric receiving module is configured to generate beat frequency signals with respect to the first dimension ±1-order diffracted light and beat frequency signals with respect to the second dimension ±1-order diffracted light and send the beat frequency signals with respect to the first dimension ±1-order diffracted light and the beat frequency signals with respect to the second dimension ±1-order diffracted light to the signal processing system. The signal processing system is configured to perform differential calculation on the beat frequency signals generated with respect to the first dimension ±1-order diffracted light and the beat frequency signals generated with respect to the second dimension ±1-order diffracted light to realize a displacement measurement of single diffraction of a first dimension and a second dimension of the two-dimensional measuring grating for four-fold optical subdivision.

Optionally, the first polarized light is an S polarized light having a frequency of $f_A$, and the second polarized light is a P polarized light having a frequency of $f_B$. The reading head includes a polarized beam splitting prism, a first quarter wave plate, a second quarter wave plate plated with a reflecting film, a third quarter wave plate, a reflecting prism, and a refracting element. The polarized beam splitting prism is configured to receive the first polarized light and the second polarized light, then transmit the second polarized light to the first quarter wave plate and reflect the first polarized light to the second quarter wave plate. The first quarter wave plate is disposed on a transmission light path of the polarized beam splitting prism and is configured to convert the second polarized light into right-handed polarized light, then the right-handed polarized light is incident to the reflecting prism. The reflecting prism is disposed on a transmission light path of the first quarter wave plate and is configured to reflect the second polarized light. When the second polarized light passes through the first quarter wave plate and then converts into the S polarized light, the S polarized light returns to the polarized beam splitting prism. The second quarter wave plate is disposed on a reflected light path of the polarized beam splitting prism and is configured to convert the first polarized light into left-handed polarized light and reflect the left-handed polarized light to pass through the second quarter wave plate to convert into the P polarized light, the P polarized light returns to the polarized beam splitting prism. The polarized beam splitting prism is further configured to transmit the first polarized light and reflect the second polarized light, so that the first polarized light and the second polarized light are combined into one beam to be incident to the third quarter wave plate. The third quarter wave plate is disposed on a light path where the polarized beam splitting prism transmits the first polarized light. The third quarter wave plate is configured to convert the first polarized light into the right-handed polarized light to be vertically incident on a surface of the two-dimensional measuring grating, and the third quarter wave plate is further configured to convert the second polarized light into the left-handed polarized light to be vertically incident on the surface of the two-dimensional measuring grating. The first polarized light and the second polarized light are respectively diffracted to generate the first dimension ±1-order diffracted light and the second dimension ±1-order diffracted light.

Optionally, the first dimension ±1-order diffracted light includes a first dimension −1-order diffracted light and a first dimension +1-order diffracted light, the second dimension ±1-order diffracted light includes a second dimension −1-order diffracted light and a second dimension +1-order diffracted light. The first dimension −1-order diffracted light, the first dimension +1-order diffracted light, the second dimension −1-order diffracted light, and the second dimension +1-order diffracted light respectively include a first polarized light component and a second polarized light component.

Optionally, the reading head includes the refracting element disposed on a diffracted light path of the two-dimensional measuring grating, the refracting element is configured to refract the first dimension −1-order diffracted light, the first dimension +1-order diffracted light, the second dimension −1-order diffracted light, and the second dimension +1-order diffracted light, so that the first dimension −1-order diffracted light, the first dimension +1-order diffracted light, the second dimension −1-order diffracted light, and the second dimension +1-order diffracted light are paralleled and are vertically incident on the third quarter wave plate. The third quarter wave plate is configured to convert the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light into the S polarized light to be vertically incident to the polarized beam splitting prism, and the third quarter wave plate is further configured to convert the second polarized light component of the first dimension −1-order diffracted light, the second polarized light component of the first dimension +1-order diffracted light, the second polarized light component of the second dimension −1-order diffracted light, and the second polarized light component of the second dimension +1-order diffracted light into the P polarized light to be vertically incident to the polarized beam splitting prism. The polarized beam splitting prism is configured to reflect the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light to the first quarter wave plate, and the polarized beam splitting prism is further configured to transmit the second polarized light component of the first dimension −1-order diffracted light, the second polarized light component of the first dimension +1-order diffracted light, the second polarized light component of the second dimension −1-order diffracted light, and the second polarized light component of the second dimension +1-order diffracted light to the second quarter wave plate. The first quarter wave plate is configured to convert the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light into the left-handed polarized light to be incident to the reflecting prism. The reflecting prism is configured to respectively perform secondary reflection on the first polarized light component of the first dimension +1-order diffracted light, the first polarized light component of the first dimension −1-order diffracted light, the first polarized light component of the second dimension −1-order diffracted light, and the first polarized light component of the second dimension +1-order diffracted light and emit the first polarized light component of the first dimension +1-order diffracted light, the first polarized light component of the first dimension −1-order diffracted light, the first polarized light component of the second dimension −1-order diffracted light, and the first polarized light component of the second dimension +1-order diffracted light to the first quarter wave plate to convert into the P polarized light, then the P polarized light is incident to the polarized beam splitting prism and is transmitted to the photoelectric receiving module through the polarized beam splitting prism. The second quarter wave plate is configured to convert the second polarized light component of the first dimension −1-order diffracted light, the second polarized light component of the first dimension +1-order diffracted light, the second polarized light component of the second dimension −1-order diffracted light, and the second polarized light component of the second dimension +1-order diffracted light into the right-handed polarized light and reflect the right-handed polarized light to pass through the second quarter wave plate to convert into the S polarized light, then the S polarized light is incident to the polarized beam splitting prism and is reflected to the photoelectric receiving module through the polarized beam splitting prism.

Optionally, the photoelectric receiving module includes a first receiver, a second receiver, a third receiver, and a fourth receiver. The first receiver is configured to receive the first polarized light component of the first dimension +1-order diffracted light and the second polarized light component of the first dimension −1-order diffracted light, generate a beat frequency signal having a frequency of $f_B-f_A$, and send the beat frequency signal having the frequency of $f_B-f_A$ to the signal processing system. The second receiver is configured to receive the first polarized light component of the first dimension −1-order diffracted light and the second polarized light component of the first dimension +1-order diffracted light, generate a beat frequency signal having a frequency of $f_B-f_A$, and send the beat frequency signal having the frequency of $f_B-f_A$ to the signal processing system. The third receiver is configured to receive the first polarized light component of the second dimension +1-order diffracted light and the second polarized light component of the second dimension −1-order diffracted light, generate a beat frequency signal having a frequency of $f_B-f_A$, and send the beat frequency signal having the frequency of $f_B-f_A$ to the signal processing system. The fourth receiver is configured to receive the first polarized light component of the second dimension −1-order diffracted light and the second polarized light component of the second dimension +1-order diffracted light, generate a beat frequency signal having a frequency of $f_B-f_A$, and send the beat frequency signal having the frequency of $f_B-f_A$ to the signal processing system.

Optionally, the first polarized light component and the second polarized light component received by the first receiver, the first polarized light component and the second polarized light component received by the second receiver, the first polarized light component and the second polarized light component received by the third receiver, and the first polarized light component and the second polarized light component received by the fourth receiver respectively pass through the reflecting prism twice, and optical path lengths of different first polarized light component and second polarized light component in the reading head are equal.

Optionally, when the two-dimensional measuring grating moves along a direction of a first dimension grating vector, the first dimension −1-order diffracted light undergoes negative frequency shift $-\Delta f$, the first dimension +1-order diffracted light undergoes forward frequency shift $+\Delta f$, the frequency of the beat frequency signal generated by the first receiver becomes $f_B-f_A-2\Delta f$, and the frequency of the beat frequency signal generated by the second receiver becomes $f_B-f_A+2\Delta f$. When the two-dimensional measuring grating moves along a direction of a second dimension grating vector, the second dimension −1-order diffracted light undergoes negative frequency shift $-\Delta f$, the second dimension +1-order diffracted light undergoes forward frequency shift $+\Delta f$, the frequency of the beat frequency signal generated by the third receiver becomes $f_B-f_A-2\Delta f$, and the frequency of the beat frequency signal generated by the fourth receiver becomes $f_B-f_A+2\Delta f$.

Optionally, the signal processing system is configured to perform the differential calculation on the beat frequency signal generated by the first receiver and the beat frequency signal generated by the second receiver to realize the displacement measurement of the single diffraction of the first dimension of the two-dimensional measuring grating for the four-fold optical subdivision, and the signal processing system is further configured to perform the differential calculation on the beat frequency signal generated by the third receiver and the beat frequency signal generated by the fourth receiver to realize the displacement measurement of the single diffraction of the second dimension of the two-dimensional measuring grating for the four-fold optical subdivision.

The present disclosure further provides a heterodyne two-dimensional grating measuring method, including the following steps:

S1: generating two beams of linearly polarized light having characteristics of overlapping, polarization orthogonal, and fixed frequency difference through a light source, where the two beams of the linearly polarized light are respectively a first polarized light having a frequency of $f_A$ and a second polarized light having a frequency of $f_B$, the first polarized light is an S polarized light, and the second polarized light is a P polarized light.

S2: respectively entering the first polarized light and the second polarized light into a reading head, reflecting and transmitting the first polarized light and the second polarized light through the reading head, and respectively incidenting the first polarized light and the second polarized light on a surface of a moving two-dimensional measuring grating to generate a first dimension ±1-order diffracted light and a second dimension ±1-order diffracted light, then respectively incidenting the first dimension ±1-order diffracted light and the second dimension ±1-order diffracted light to a photoelectric receiving module through the reading head.

S3: generating beat frequency signals with respect to the first dimension ±1-order diffracted light and beat frequency signals with respect to the second dimension ±1-order diffracted light through the photoelectric receiving module, and sending the beat frequency signals with respect to the first dimension ±1-order diffracted light and the beat frequency signals with respect to the second dimension ±1-order diffracted light to a signal processing system.

S4: performing differential calculation on the beat frequency signals generated with respect to the first dimension ±1-order diffracted light and the beat frequency signals generated with respect to the second dimension ±1-order diffracted light to realize a displacement measurement of single diffraction of a first dimension and a second dimension of the two-dimensional measuring grating for four-fold optical subdivision.

Optionally, the step S2 includes following steps:

S201: reflecting the first polarized light to a second quarter wave plate through a polarized beam splitting prism, converting the first polarized light into left-handed polarized light, reflecting the first polarized light through the second quarter wave plate to convert into the P polarized light, and then returning the first polarized light to the polarized beam splitting prism; and transmitting the second polarized light to a first quarter wave plate through the polarized beam splitting prism, converting the second polarized light into right-handed polarized light, incidenting the second polarized light into the reflecting prism, reflecting the second polarized light through the reflecting prism, returning the second polarized light to the polarized beam splitting prism after the second polarized light passes through the first quarter wave plate and converts into the S polarized light.

S202: transmitting the first polarized light through the polarized beam splitting prism, reflecting the second polarized light through the polarized beam splitting prism, so that the first polarized light and the second polarized light are combined into one beam to be incident to the third quarter wave plate: converting the first polarized light into the right-handed polarized light through the third quarter wave plate, vertically incidenting the first polarized light on a surface of the two-dimensional measuring grating, and converting the second polarized light into the left-handed polarized light through the third quarter wave plate, vertically incidenting the second polarized light on the surface of the two-dimensional measuring grating; and respectively diffracting the first polarized light and the second polarized light to generate the first dimension ±1-order diffracted light and the second dimension ±1-order diffracted light.

Optionally, the first dimension ±1-order diffracted light includes a first dimension −1-order diffracted light and a first dimension +1-order diffracted light, the second dimension ±1-order diffracted light comprises a second dimension −1-order diffracted light and a second dimension +1-order diffracted light. The first dimension −1-order diffracted light, the first dimension +1-order diffracted light, the second dimension −1-order diffracted light, and the second dimension +1-order diffracted light respectively include a first polarized light component and a second polarized light component.

Optionally, the heterodyne two-dimensional grating measuring method further includes following steps after the step S202.

S203: refracting the first dimension −1-order diffracted light, the first dimension +1-order diffracted light, the second dimension −1-order diffracted light, and the second +1-order diffracted light through the refracting element to be parallel and be vertically incident to the third quarter wave plate.

S204: converting the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light into the S polarized light through the third quarter wave plate to be vertically incident to the polarized beam splitting prism; and converting the second polarized light component of the first dimension −1-order diffracted light, the second polarized light component of the first dimension +1-order diffracted light, the second polarized light component of the second dimension −1-order diffracted light, and the second polarized light component of the second dimension +1-order diffracted light into the P polarized light through the third quarter wave plate to be vertically incident to the polarized beam splitting prism.

S205: reflecting the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light to the first quarter wave plate through the polarized beam splitting prism; and transmitting the second polarized light component of the first dimension −1-order diffracted light, the second polarized light component of the first dimension +1-order diffracted light, the second polarized light component of the second dimension −1-order diffracted light, and the second polarized light component of the second dimension +1-order diffracted light to the second quarter wave plate through the polarized beam splitting prism.

S206: converting the second polarized light component of the first dimension −1-order diffracted light, the second polarized light component of the first dimension +1-order diffracted light, the second polarized light component of the second dimension −1-order diffracted light, and the second polarized light component of the second dimension +1-order diffracted light into the right-handed polarized light through the second quarter wave plate, reflecting the right-handed polarized light to pass through the second quarter wave plate to convert into the S polarized light; incidenting the S polarized light to the polarized beam splitting prism and reflecting the S polarized light to the photoelectric receiving module through the polarized beam splitting prism; converting the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light into the left-handed polarized light through the first quarter wave plate to be incident to the reflecting prism; respectively performing secondary reflection on the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light and emitting the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light to the first quarter wave plate through the reflecting prism to convert into the P polarized light: then incidenting the P polarized light to the polarized beam splitting prism and transmitting the P polarized light to the photoelectric receiving module through the polarized beam splitting prism.

Optionally, the photoelectric receiving module includes a first receiver, a second receiver, a third receiver, and a fourth receiver. The first receiver is configured to receive the first polarized light component of the first dimension +1-order diffracted light and the second polarized light component of the first dimension −1-order diffracted light, generate a beat frequency signal having a frequency of $f_B-f_A$, and send the beat frequency signal having the frequency of $f_B-f_A$ to the signal processing system. The second receiver is configured to receive the first polarized light component of the first dimension −1-order diffracted light and the second polarized light component of the first dimension +1-order diffracted light, generate a beat frequency signal having a frequency of $f_B-f_A$, and send the beat frequency signal having the frequency of $f_B-f_A$ to the signal processing system. The third receiver is configured to receive the first polarized light component of the second dimension +1-order diffracted light and the second polarized light component of the second dimension −1-order diffracted light, generate a beat frequency signal having a frequency of $f_B-f_A$, and send the beat frequency signal having the frequency of $f_B-f_A$ to the signal processing system. The fourth receiver is configured to receive the first polarized light component of the second dimension −1-order diffracted light and the second polarized light component of the second dimension +1-order diffracted light, generate a beat frequency signal having a frequency of $f_B-f_A$, and send the beat frequency signal having the frequency of $f_B-f_A$ to the signal processing system.

Optionally, the first polarized light component and the second polarized light component received by the first receiver, the first polarized light component and the second polarized light component received by the second receiver, the first polarized light component and the second polarized light component received by the third receiver, and the first polarized light component and the second polarized light component received by the fourth receiver respectively pass through the reflecting prism twice, and optical path lengths of different first polarized light component and second polarized light component in the reading head are equal.

Optionally, when the two-dimensional measuring grating moves along a direction of a first dimension grating vector, the first dimension −1-order diffracted light undergoes negative frequency shift −Δf, the first dimension +1-order diffracted light undergoes forward frequency shift +Δf, the frequency of the beat frequency signal generated by the first receiver becomes $f_B-f_A-2\Delta f$, and the frequency of the beat frequency signal generated by the second receiver becomes $f_B-f_A+2\Delta f$. When the two-dimensional measuring grating moves along a direction of a second dimension grating vector, the second dimension −1-order diffracted light undergoes negative frequency shift −Δf, the second dimension +1-order diffracted light undergoes forward frequency shift +Δf, the frequency of the beat frequency signal generated by the third receiver becomes $f_B-f_A-2\Delta f$, and the frequency of the beat frequency signal generated by the fourth receiver becomes $f_B-f_A+2\Delta f$.

Optionally, the signal processing system is configured to perform the differential calculation on the beat frequency signal generated by the first receiver and the beat frequency signal generated by the second receiver to realize the displacement measurement of the single diffraction of the first dimension of the two-dimensional measuring grating for the four-fold optical subdivision; and the signal processing system is further configured to perform the differential calculation on the beat frequency signal generated by the third receiver and the beat frequency signal generated by the fourth receiver to realize the displacement measurement of the single diffraction of the second dimension of the two-dimensional measuring grating for the four-fold optical subdivision.

Compared with the prior art, the present disclosure realizes four-fold optical subdivision through the single diffraction on the surface of the two-dimensional measuring grating, which effectively prevents measuring accuracy from being influenced by grating surface shape accuracy and a grating attitude error. In addition, the heterodyne two-dimensional grating measuring device of the present disclosure is simple in structure, small in size, light in weight, easy in installation, convenient in application, etc. Meanwhile, the optical subdivision of higher multiples is realized through combining a method of secondary diffraction or multiple diffraction.

Figure 1:
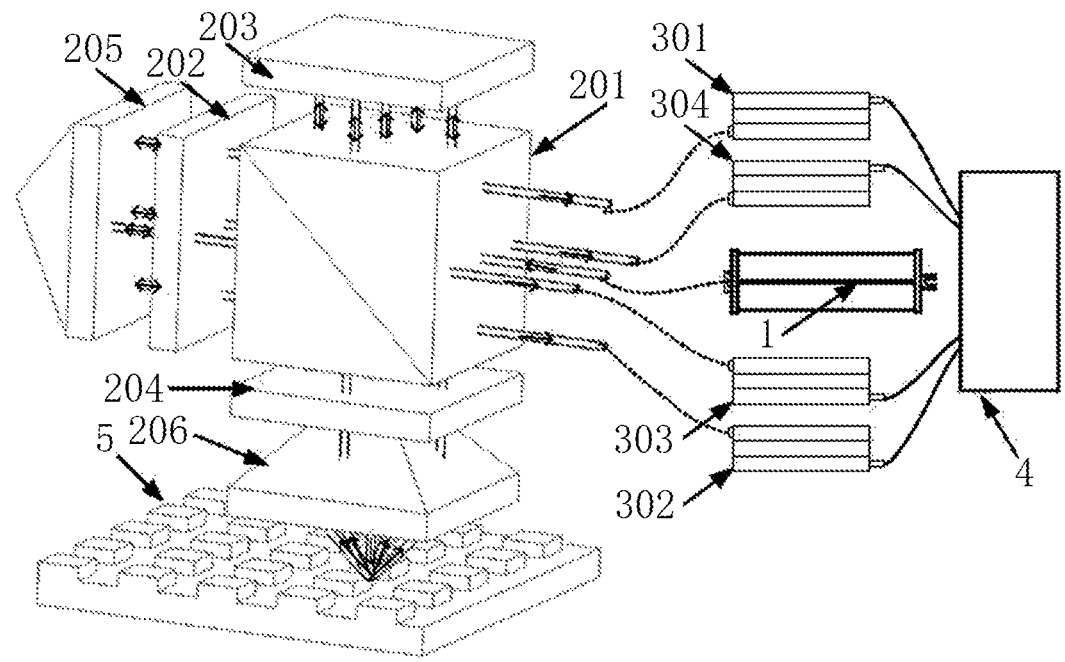
FIG. 1 is a principal schematic diagram of a heterodyne two-dimensional grating measuring device, based on single diffraction, to realize four-fold optical subdivision according to embodiment 1 of the present disclosure.

Reference numerals in Embodiment 1 include: light source 1; polarized beam splitting prism 201; 202; first quarter wave plate 202; second quarter wave plate 203; third quarter splitting prism 204; reflecting prism 205; refracting element 206; first receiver 301; second receiver 302; third receiver 303; fourth receiver 304; signal processing system 4; and two-dimensional measuring grating 5.

DETAILED DESCRIPTION

In order to make objectives, technical solutions and advantages of the present disclosure clearer, the present disclosure is further described in detail below with reference to accompanying drawings and specific embodiments. It should be understood that the specific embodiments described herein are only configured to explain the present disclosure, but not to limit the present disclosure.

The present disclosure provides a heterodyne two-dimensional grating measuring device and measuring method thereof, which fixes a one-dimensional measuring grating on an object to be measured to regard as a scale for displacement measurement. When the one-dimensional measuring grating moves along with the object to be measured, the displacement measurement of the object is measured through measuring the displacement of the one-dimensional measuring grating.

In order to solve a problem of realizing optical subdivision of four-fold or higher fold in prior art through secondary diffraction or multiple diffraction, an optical structure of a measuring system may become more complex. In addition, the multiple diffraction uses diffracted lights at different positions of a grating, grating surface shape accuracy and a grating attitude error may greatly affect measuring accuracy.

According to the heterodyne two-dimensional grating measuring device and measuring method thereof provided by the present disclosure, a special structural design is carried out on a reading head, so that when two beams of polarized light having a fixed frequency difference emitted by a light source are incident on a surface of a two-dimensional measuring grating through the reading head, a single diffraction achieves four-fold optical subdivision, which prevents the measuring accuracy from being influenced by the grating surface shape accuracy and the grating attitude error. In addition, the reading head in the present disclosure is simple in structure, small in volume, and light in weight, which simplify complexity of the optical structure in the measuring system. The present disclosure may further combine the secondary diffraction or the multiple diffraction to achieve better multiples of optical subdivision.

The heterodyne two-dimensional grating measuring device and measuring method thereof provided by the present disclosure is expanded and described by taking the single diffraction to achieve the four-fold optical subdivision as an example Embodiment 1

FIG. 1 represents a structure of a heterodyne two-dimensional grating measuring device according to embodiment 1 of the present disclosure.

As shown in FIG. 1, the present disclosure provides a heterodyne two-dimensional grating measuring device, including a light source 1, a reading head, a photoelectric receiving module, and a signal processing system 4. The light source 1 is configured to generate two beams of linearly polarized light having characteristics of overlapping, polarization orthogonal, and fixed frequency difference as measuring light beams. The two beams of linearly polarized light are respectively a first polarized light and a second polarized light, the first polarized light is a first S polarized light having a frequency of $f_A$, and the second polarized light is a first P polarized light having a frequency of $f_B$. The light source 1 may be a dual-frequency laser 1 or two lasers emitting a fixed frequency difference. The reading head is configured to incident the two beams of polarized lights on a surface of a moving two-dimensional measuring grating 5, the two beams of polarized lights pass through the surface of the moving two-dimensional measuring grating 5 and is diffracted to generate a first dimension ±1-order diffracted light and a second dimension ±1-order diffracted light, the first dimension ±1-order diffracted light and the second dimension ±1-order diffracted light are incident to the reading head and are finally emitted from the reading head and are incident to the photoelectric receiving module. The photoelectric receiving module is configured to receive the first dimension ±1-order diffracted light and the second dimension ±1-order diffracted light to generate four paths of beat frequency signals and further achieve the four-fold optical subdivision. The photoelectric receiving module includes a first receiver 301, a second receiver 302, a third receiver 303, and a fourth receiver 304. The first receiver 301 and the second receiver 302 are configured to receive the first dimension ±1-order diffracted light to generate two paths of the beat frequency signals to send to the signal processing system 4, the third receiver 303 and the fourth receiver 304 are configured to receive the second dimension ±1-order diffracted light to generate two paths of the beat frequency signals to send to the signal processing system 4. The signal processing system 4 is configured to receive the beat frequency signals sending from the first receiver 301, the second receiver 302, the third receiver 303, and the fourth receiver 304, perform differential calculation on the beat frequency signals sending from the first receiver 301 and the second receiver 302 to realize a displacement measurement of single diffraction of a first dimension of the two-dimensional measuring grating 5 for four-fold optical subdivision, and further perform differential calculation on the beat frequency signals sending from the third receiver 303 and the fourth receiver 304 to realize a displacement measurement of single diffraction of a second dimension of the two-dimensional measuring grating 5 for four-fold optical subdivision.

The reading head includes a polarized beam splitting prism 201, a first quarter wave plate 202, a second quarter wave plate 203, a third quarter wave plate 204, a reflecting prism 205, and a refracting element 206. The polarized beam splitting prism 201 is configured to reflect the S polarized light and transmit the P polarized light. The first quarter wave plate 202 is disposed on a transmission light path of the polarized beam splitting prism 201. The second quarter wave plate is disposed on a reflected light path of the polarized beam splitting prism 201, a surface of the second quarter wave plate 203 is plated with a reflecting film, and the reflecting film is configured to reflect lasers. The third quarter wave plate 204 is disposed on an opposite surface of the second quarter wave plate 203, so that the second quarter wave plate 204 is disposed on in an opposite direction of the second quarter wave plate 203 on the polarized beam splitting prism 201. The refracting element 206 is disposed on a diffracted light path of the two-dimensional measuring grating 5 and is configured to refract the lasers.

Figure 2:
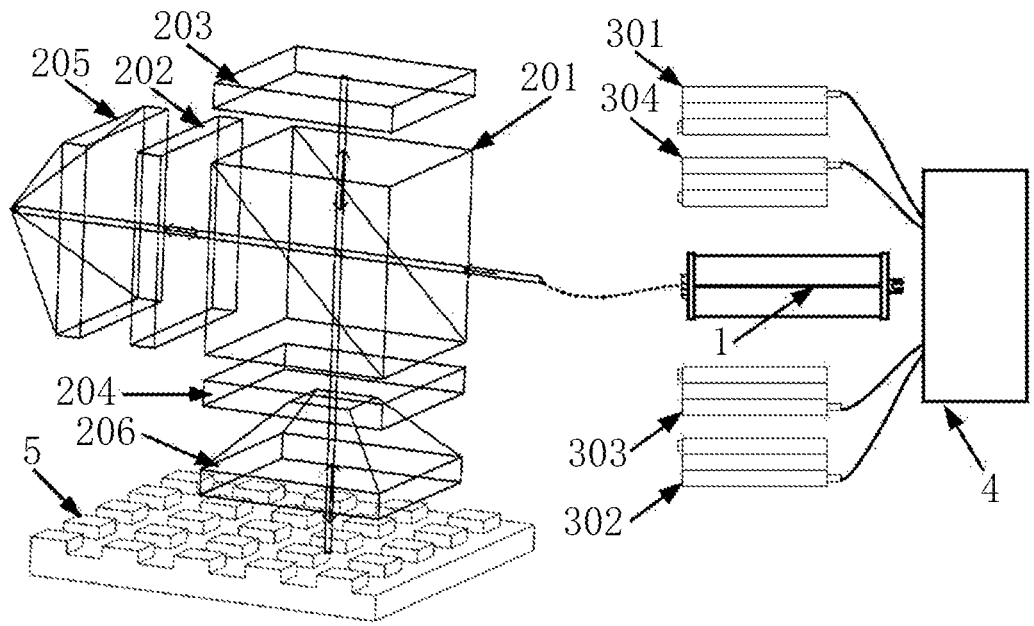
FIG. 2 is a schematic diagram of an optical path transmission principle before beam diffraction according to embodiment 1 of the present disclosure.
Figure 3:
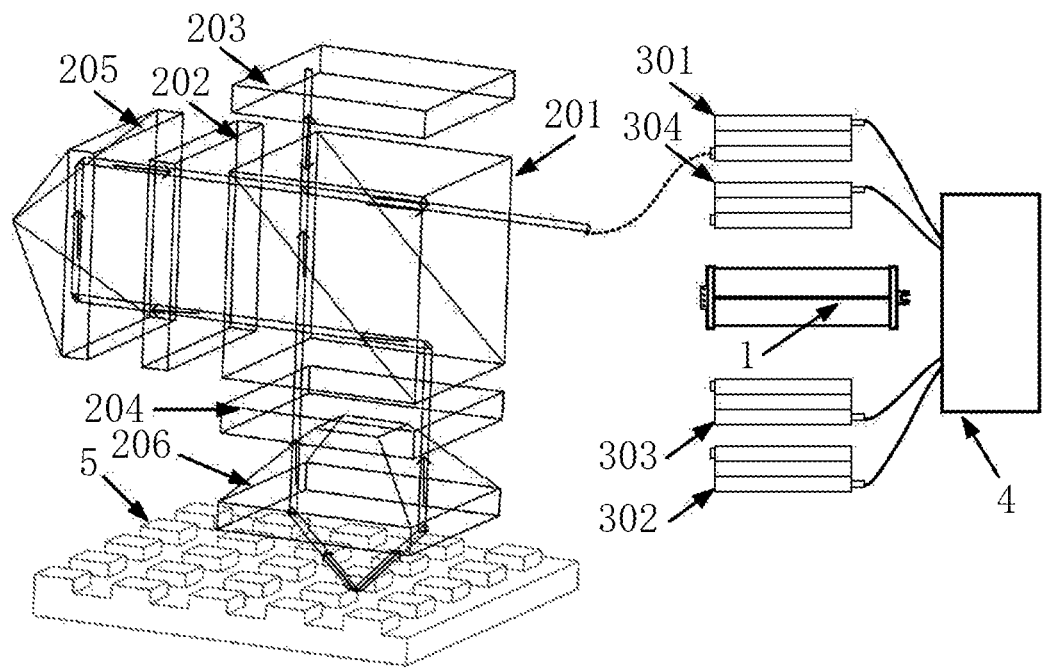
FIG. 3 is a principal schematic diagram of generating a first beat frequency signal of a first dimension according to embodiment 1 of the present disclosure.
Figure 4:
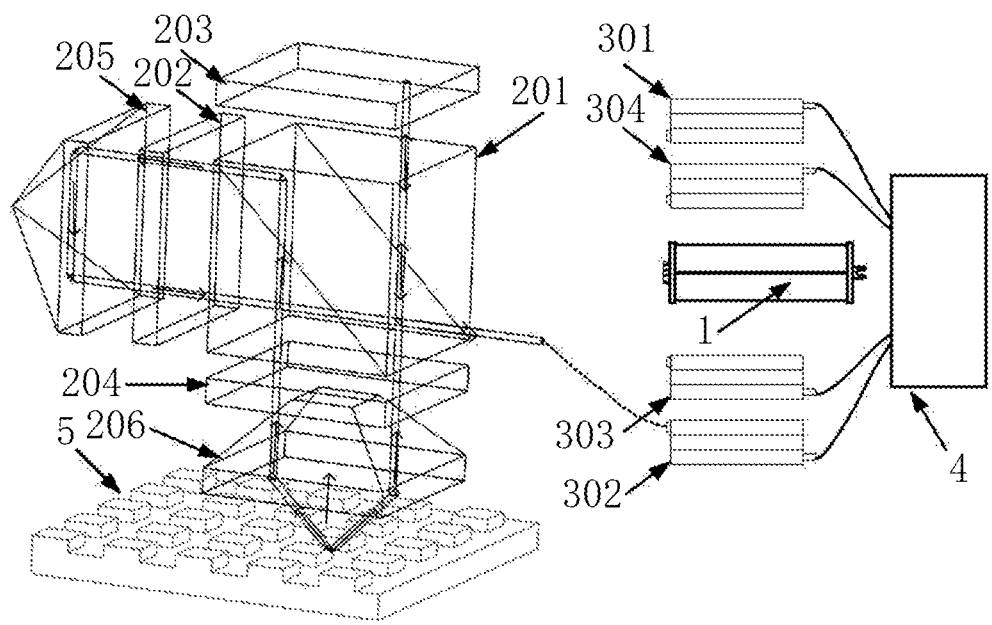
FIG. 4 is a principal schematic diagram of generating a second beat frequency signal of the first dimension according to embodiment 1 of the present disclosure.
Figure 5:
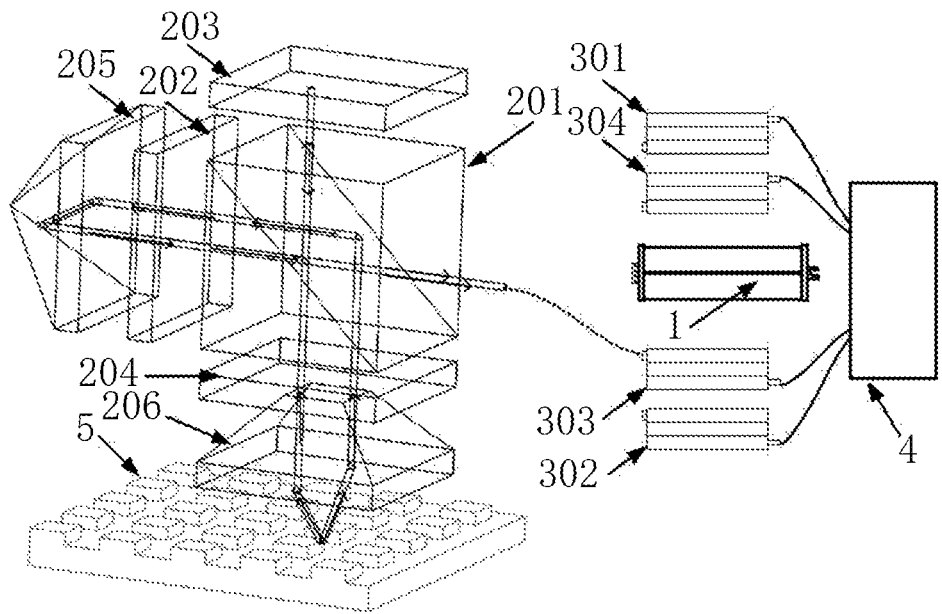
FIG. 5 is a principal schematic diagram of generating a first beat frequency signal of a second dimension according to embodiment 1 of the present disclosure.

FIG. 2 represents an optical path transmission principle before beam diffraction according to embodiment 1 of the present disclosure.

As shown in FIG. 2, before the first polarized light and the second polarized light are incident to the two-dimensional measuring grating 5 to be diffracted, an optical path transmission path is as follows. The light source 1 emits the first polarized light to be incident to the polarized beam splitting prism 201, the polarized beam splitting prism 201 reflects the first polarized light to the second quarter wave plate to convert into a first left-handed polarized light, the reflecting film plated on the second quarter wave plate 203 reflects the first left-handed polarized light to the second quarter wave plate 203, and the second quarter wave plate 203 coverts the first left-handed polarized light into a second P polarized light to return to the polarized beam splitting prism 201.

The light source 1 emits the second polarized light to be incident to the polarized beam splitting prism 201, the polarized beam splitting prism 201 transmits the second polarized light to the first quarter wave plate 202 to convert into a first right-handed polarized light, and the first right-handed polarized light is incident to the reflecting prism 205. The reflecting prism 205 emits the first right-handed polarized light to the first quarter wave plate 202, the first quarter wave plate 202 converts the first right-handed polarized light into a second S polarized light to return to the polarized beam splitting prism 201. The polarized beam splitting prism 201 transmits the second P polarized light (the P polarized light) and reflects the second S polarized light (the S polarized light), so that the second P polarized light and the second S polarized light are combined into one beam to be incident to the third quarter wave plate 204. The third quarter wave plate 204 converts the second P polarized light into a second right-handed polarized light to be incident on a surface of the two-dimensional measuring grating 5 and covers the second S polarized light into a second left-handed polarized light to be incident on the surface of the two-dimensional measuring grating 5.

The two-dimensional measuring grating 5 diffracts the second right-handed polarized light to generate a first dimension −1-order diffracted light and a first dimension +1-order diffracted light, and the two-dimensional measuring grating 5 diffracts the second left-handed polarized light to generate a second dimension −1-order diffracted light and a second dimension +1-order diffracted light.

Dimension division of the first dimension and the second dimension is performed according to an etching grooves direction of the two-dimensional measuring grating, which refers to two directions of etching grooves disposed on the surface of the two-dimensional measuring grating.

The first dimension −1-order diffracted light, the first dimension +1-order diffracted light, the second dimension −1-order diffracted light, and the second dimension +1-order diffracted light respectively include a first polarized light component and a second polarized light component.

The first polarized light component of the first dimension +1-order diffracted light and the second polarized light component of the first dimension −1-order diffracted light generate a first beat frequency signal of the first dimension.

The first polarized light component of the first dimension −1-order diffracted light and the second polarized light component of the first dimension +1-order diffracted light generate a second beat frequency signal of the first dimension.

The first polarized light component of the second dimension +1-order diffracted light and the second polarized light component of the second dimension −1-order diffracted light generate a first beat frequency signal of the second dimension.

The first polarized light component of the second dimension −1-order diffracted light and the second polarized light component of the second dimension +1-order diffracted light generate a second beat frequency signal of the second dimension.

FIGS. 3-6 represent a principle of generating the first beat frequency signal of the first dimension, the second beat frequency signal of the first dimension, the first beat frequency of the second dimension, and the second beat frequency of the second dimension.

As shown in FIGS. 3-6, the refracting element 206 refracts the first dimension −1-order diffracted light, the first dimension +1-order diffracted light, the second dimension −1-order diffracted light, and the second dimension +1-order diffracted light to be paralleled and vertically incident on the third quarter wave plate 204.

The third quarter wave plate 204 converts the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light into a third S polarized light to be vertically incident to the polarized beam splitting prism 201, and the third quarter wave plate 204 further converts the second polarized light component of the first dimension −1-order diffracted light, the second polarized light component of the first dimension +1-order diffracted light, the second polarized light component of the second dimension −1-order diffracted light, and the second polarized light component of the second dimension +1-order diffracted light into a third P polarized light to be vertically incident to the polarized beam splitting prism 201.

The polarized beam splitting prism 201 reflects the third S polarized light to the first quarter wave plate 202, and the polarized beam splitting prism 201 further transmits the third P polarized light to the second quarter wave plate 203.

The second quarter wave plate 203 converts the third P polarized light into a third right-handed polarized light and reflect the third right-handed polarized light to pass through the second quarter wave plate 203 to convert into a fourth S polarized light, then the fourth S polarized light is incident to the polarized beam splitting prism 201 and is reflected through the polarized beam splitting prism 201 to be respectively incident to the first receiver 301, the second receiver 302, the third receiver 303, and the four receiver.

The first quarter wave plate 202 converts the third S polarized light into a third left-handed polarized light to be incident to the reflecting prism 205. The reflecting prism 205 respectively performs secondary reflection on the third left-handed polarized light and emits the third left-handed polarized light to the first quarter wave plate 202 to convert into a fourth P polarized light, then the fourth P polarized light is incident to the polarized beam splitting prism 201 and the polarized beam splitting prism 201 respectively incidents the fourth P polarized light to the second receiver 302, the first receiver 301, the fourth receiver 304, and the third receiver 303.

It should be noted that the first polarized light component and the second polarized light component received by the first receiver, the first polarized light component and the second polarized light component received by the second receiver, the first polarized light component and the second polarized light component received by the third receiver, and the first polarized light component and the second polarized light component received by the fourth receiver respectively pass through the reflecting prism twice, and optical path lengths of different first polarized light component and second polarized light component in the reading head are equal, which works in two ways as follows.

First, the measuring signals are ensured to have a constant value of optical path difference when entering the first receiver 301, the second receiver 302, the third receiver 303, and the fourth receiver 304.

Second, when an environment temperature of a heterodyne two-dimension grating displacement measuring optical system changes, optical path difference changes of the measuring light beam are consistent, so that the measuring light beam may not be influenced by thermal expansion and contraction of optical elements of the reading head, and measuring errors are not introduced.

The first receiver 301 is configured to receive the fourth P polarized light corresponding to the first polarized light component of the first dimension +1-order diffracted light and the fourth S polarized light corresponding to the second polarized light component of the first dimension −1-order diffracted light, generate a beat frequency signal having a frequency of $f_B - f_A$, and send the beat frequency signal having the frequency of $f_B - f_A$ to the signal processing system.

The second receiver 302 is configured to receive the fourth P polarized light corresponding to the first polarized light component of the first dimension −1-order diffracted light and the fourth S polarized light corresponding to the second polarized light component of the first dimension +1-order diffracted light, generate a beat frequency signal having a frequency of $f_B - f_A$, and send the beat frequency signal having the frequency of $f_B - f_A$ to the signal processing system.

The third receiver 303 is configured to receive the fourth P polarized light corresponding to the first polarized light component of the second dimension +1-order diffracted light and the fourth S polarized light corresponding to the second polarized light component of the second dimension −1-order diffracted light, generate a beat frequency signal having a frequency of $f_B - f_A$, and send the beat frequency signal having the frequency of $f_B - f_A$ to the signal processing system.

The fourth receiver 304 is configured to receive the fourth P polarized light corresponding to the first polarized light component of the second dimension −1-order diffracted light and the fourth S polarized light corresponding to the second polarized light component of the second dimension +1-order diffracted light, generate a beat frequency signal having a frequency of $f_B - f_A$, and send the beat frequency signal having the frequency of $f_B - f_A$ to the signal processing system.

When the two-dimensional measuring grating 5 moves along a direction of a first dimension grating vector, due to a grating Doppler frequency effect, the first dimension −1-order diffracted light undergoes negative frequency shift $-\Delta f$, the first dimension +1-order diffracted light undergoes forward frequency shift $+\Delta f$, the frequency of the beat frequency signal generated by the first receiver 301 becomes $f_B - f_A - 2\Delta f$, and the frequency of the beat frequency signal generated by the second receiver 302 becomes $f_B - f_A + 2\Delta f$.

When the two-dimensional measuring grating 5 moves along a direction of a second dimension grating vector, due to a grating Doppler frequency effect, the second dimension −1-order diffracted light undergoes negative frequency shift $-\Delta f$, the second dimension +1-order diffracted light undergoes forward frequency shift $+\Delta f$, the frequency of the beat frequency signal generated by the third receiver 303 becomes $f_B - f_A - 2\Delta f$, and the frequency of the beat frequency signal generated by the fourth receiver 304 becomes $f_B - f_A + 2\Delta f$.

The signal processing system 4 is configured to perform the differential calculation on the beat frequency signal generated by the first receiver 301 and the beat frequency signal generated by the second receiver 302 to realize the displacement measurement of the single diffraction of the first dimension of a heterodyne grating for the four-fold optical subdivision, and the signal processing system 4 is further configured to perform the differential calculation on the beat frequency signal generated by the third receiver 303 and the beat frequency signal generated by the fourth receiver 304 to realize the displacement measurement of the single diffraction of the second dimension of the heterodyne grating for the four-fold optical subdivision.

Embodiment 2

The embodiment 1 of the present disclosure provides a structure of the heterodyne two-dimensional grating measuring device. Corresponding to the heterodyne two-dimensional grating measuring device of the embodiment 1 of the present disclosure, embodiment 2 of the present disclosure provides a method for a grating displacement measurement through the heterodyne two-dimensional grating measuring device of the embodiment 1.

Figure 7:
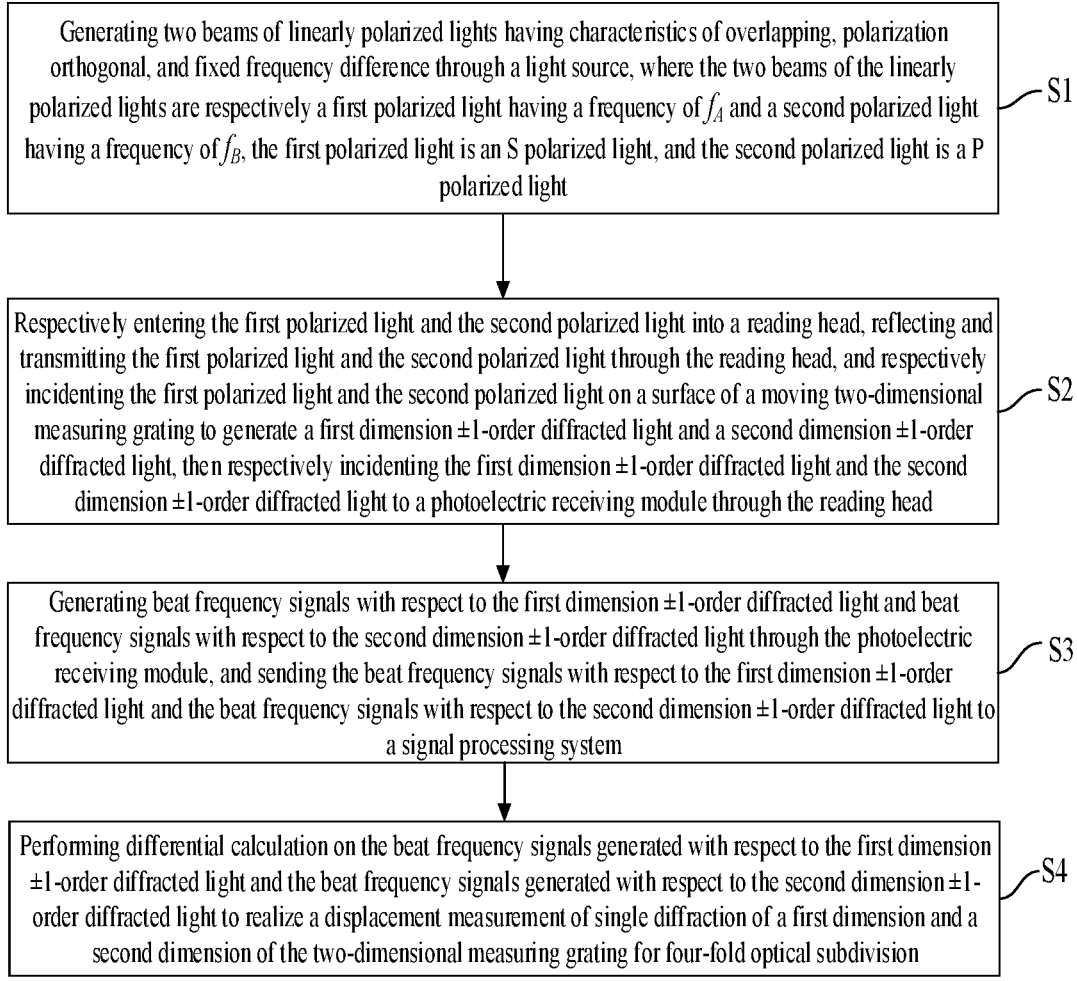
FIG. 7 is a schematic flowchart of a heterodyne two-dimensional grating measuring method according to embodiment 2 of the present disclosure.

FIG. 7 is a schematic flowchart of a heterodyne two-dimensional grating measuring method according to embodiment 2 of the present disclosure.

Figure 6:
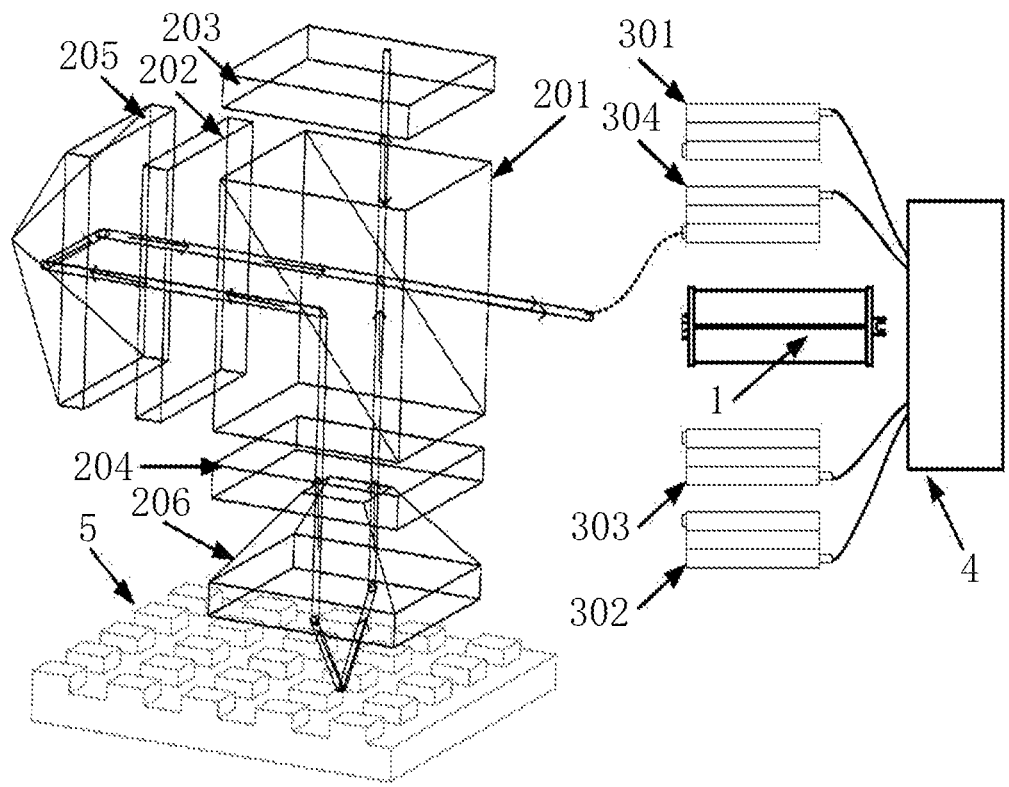
FIG. 6 is a principal schematic diagram of generating a second beat frequency signal of the second dimension according to embodiment 1 of the present disclosure.

As shown in FIG. 6, the heterodyne two-dimensional grating measuring method according to embodiment 2 of the present disclosure includes following steps.

S1: generating two beams of linearly polarized light having characteristics of overlapping, polarization orthogonal, and fixed frequency difference through a light source, where the two beams of the linearly polarized light are respectively a first polarized light in a polarization state and a second polarized light in a P polarization state.

The light source 1 may be a dual-frequency laser 1 or two lasers emitting a fixed frequency difference. The emitted two beams of the lasers having the same fixed frequency difference are respectively the first polarized light having a frequency of $f_A$ and the second polarized light having a frequency of $f_B$, the first polarized light is a first S polarized light, and the second polarized light is a first P polarized light.

S2: respectively entering the first polarized light and the second polarized light into a reading head, reflecting and transmitting the first polarized light and the second polarized light through the reading head, and respectively incidenting the first polarized light and the second polarized light on a surface of a moving two-dimensional measuring grating to generate a first dimension ±1-order diffracted light and a second dimension ±1-order diffracted light, then respectively incidenting the first dimension ±1-order diffracted light and the second dimension ±1-order diffracted light to a photoelectric receiving module through the reading head.

The step S2 includes the following steps.

S201: reflecting the first polarized light to a second quarter wave plate through a polarized beam splitting prism, converting the first polarized light into a first left-handed polarized light, reflecting the first left-handed polarized light through the second quarter wave plate to convert into a second P polarized light, and then returning the second P polarized light to the polarized beam splitting prism, and transmitting the second polarized light to a first quarter wave plate through the polarized beam splitting prism, converting the second polarized light into a first right-handed polarized light, incidenting the first right-handed polarized light into the reflecting prism, reflecting the first right-handed polarized light through the reflecting prism, returning the first right-handed polarized light to the polarized beam splitting prism after the first right-handed polarized light passes through the first quarter wave plate and converts into a second S polarized light.

S202: transmitting the second P light through the polarized beam splitting prism, reflecting the second S polarized light through the polarized beam splitting prism, so that the second P polarized light and the second S polarized light are combined into one beam to be incident to the third quarter wave plate: converting the second P polarized light into a second right-handed polarized light through the third quarter wave plate, vertically incidenting the second right-handed polarized light on a surface of the two-dimensional measuring grating, and converting the second S polarized light into a second left-handed polarized light through the third quarter wave plate, vertically incidenting the second left-handed polarized light on the surface of the two-dimensional measuring grating: diffracting the second right-handed polarized light to generate the first dimension −1-order diffracted light and the first dimension +1-order diffracted light, and diffracting the second left-handed polarized light to generate the second dimension −1-order diffracted light and the second dimension +1-order diffracted light.

The first dimension −1-order diffracted light, the first dimension +1-order diffracted light, the second dimension −1-order diffracted light, and the second dimension +1-order diffracted light respectively include a first polarized light component and a second polarized light component S203: refracting the first dimension −1-order diffracted light, the first dimension +1-order diffracted light, the second dimension −1-order diffracted light, and the second +1-order diffracted light through the refracting element to be parallel and be vertically incident to the third quarter wave plate.

S204: converting the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light into a third S polarized light through the third quarter wave plate to be vertically incident to the polarized beam splitting prism; and converting the second polarized light component of the first dimension −1-order diffracted light, the second polarized light component of the first dimension +1-order diffracted light, the second polarized light component of the second dimension −1-order diffracted light, and the second polarized light component of the second dimension +1-order diffracted light into a third P polarized light through the third quarter wave plate to be vertically incident to the polarized beam splitting prism.

S205: reflecting the third S polarized light converting from the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light to the first quarter wave plate through the polarized beam splitting prism; and transmitting the third P polarized light converting from the second polarized light component of the first dimension −1-order diffracted light, the second polarized light component of the first dimension +1-order diffracted light, the second polarized light component of the second dimension −1-order diffracted light, and the second polarized light component of the second dimension +1-order diffracted light to the second quarter wave plate through the polarized beam splitting prism.

S206: converting the third P polarized light converting from the second polarized light component of the first dimension −1-order diffracted light, the second polarized light component of the first dimension +1-order diffracted light, the second polarized light component of the second dimension −1-order diffracted light, and the second polarized light component of the second dimension +1-order diffracted light into a third right-handed polarized light through the second quarter wave plate, reflecting the third right-handed polarized light to pass through the second quarter wave plate to convert into a fourth S polarized light; incidenting the fourth S polarized light to the polarized beam splitting prism and reflecting the fourth S polarized light to the photoelectric receiving module through the polarized beam splitting prism: converting the third S polarized light converting from the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light into a third left-handed polarized light through the first quarter wave plate to be incident to the reflecting prism; respectively performing secondary reflection on the third left-handed polarized light and emitting the third left-handed polarized light to the first quarter wave plate through the reflecting prism to convert into a fourth P polarized light: then incidenting the fourth P polarized light to the polarized beam splitting prism and transmitting the fourth P polarized light to the photoelectric receiving module through the polarized beam splitting prism.

S3: generating beat frequency signals with respect to the first dimension ±1-order diffracted light and beat frequency signals with respect to the second dimension +1-order diffracted light through the photoelectric receiving module, and sending the beat frequency signals with respect to the first dimension ±1-order diffracted light and the beat frequency signals with respect to the second dimension ±1-order diffracted light to a signal processing system.

The photoelectric receiving module includes a first receiver, a second receiver, a third receiver, and a fourth receiver. The first receiver is configured to receive the fourth P polarized light corresponding to the first polarized light component of the first dimension +1-order diffracted light and the fourth S polarized light corresponding to the second polarized light component of the first dimension −1-order diffracted light, generate a beat frequency signal having a frequency of $f_B-f_A$, and send the beat frequency signal having the frequency of $f_B-f_A$ to the signal processing system. The second receiver is configured to receive the fourth P polarized light corresponding to the first polarized light component of the first dimension −1-order diffracted light and the fourth S polarized light corresponding to the second polarized light component of the first dimension +1-order diffracted light, generate a beat frequency signal having a frequency of $f_B-f_A$, and send the beat frequency signal having the frequency of $f_B-f_A$ to the signal processing system. The third receiver is configured to receive the fourth P polarized light corresponding to the first polarized light component of the second dimension +1-order diffracted light and the fourth S polarized light corresponding to the second polarized light component of the second dimension −1-order diffracted light, generate a beat frequency signal having a frequency of $f_B-f_A$, and send the beat frequency signal having the frequency of $f_B-f_A$ to the signal processing system. The fourth receiver is configured to receive the first polarized light component of the second dimension −1-order diffracted light and the second polarized light component of the second dimension +1-order diffracted light, generate a beat frequency signal having a frequency of $f_B-f_A$, and send the beat frequency signal having the frequency of $f_B-f_A$ to the signal processing system.

When the two-dimensional measuring grating moves along a direction of a first dimension grating vector, the first dimension −1-order diffracted light undergoes negative frequency shift −Δf, the first dimension +1-order diffracted light undergoes forward frequency shift +Δf, the frequency of the beat frequency signal generated by the first receiver becomes $f_B-f_A-2\Delta f$, and the frequency of the beat frequency signal generated by the second receiver becomes $f_B-f_A+2\Delta f$. When the two-dimensional measuring grating moves along a direction of a second dimension grating vector, the second dimension −1-order diffracted light undergoes negative frequency shift −Δf, the second dimension +1-order diffracted light undergoes forward frequency shift +Δf, the frequency of the beat frequency signal generated by the third receiver becomes $f_B-f_A-2\Delta f$, and the frequency of the beat frequency signal generated by the fourth receiver becomes $f_B-f_A+2\Delta f$.

S4: performing differential calculation on the beat frequency signals generated with respect to the first dimension ±1-order diffracted light and the beat frequency signals generated with respect to the second dimension ±1-order diffracted light to realize a displacement measurement of single diffraction of a first dimension and a second dimension of the two-dimensional measuring grating for four-fold optical subdivision.

Specifically, the signal processing system is configured to perform the differential calculation on the beat frequency signal generated by the first receiver and the beat frequency signal generated by the second receiver to realize the displacement measurement of the single diffraction of the first dimension of the two-dimensional measuring grating for the four-fold optical subdivision; and the signal processing system is further configured to perform the differential calculation on the beat frequency signal generated by the third receiver and the beat frequency signal generated by the fourth receiver to realize the displacement measurement of the single diffraction of the second dimension of the two-dimensional measuring grating for the four-fold optical subdivision.

In description of the present disclosure, the description with reference to terms "one embodiment", "some embodiments", "example", "specific example", or "some examples", etc., means that a particular feature, structure, material or characteristic described in connection with the embodiment or example is included in at least one embodiment or example of the present disclosure. In the specification of the present disclosure, schematic representations of the above terms are not necessarily directed to the same embodiment or example. Furthermore, the particular features, structures, materials or characteristics described may be combined in any suitable manner in any one or more embodiments or examples. In addition, different embodiments or examples and features of different embodiments or examples described in the specification may be combined and composed by those skilled in the art without contradiction.

Although the embodiments of the present disclosure have been shown and described above, it should be understood that the above embodiments are exemplary and should not be construed as limiting the present disclosure, and those skilled in the art may make variations, modifications, substitutions, and variations to the above embodiments within the scope of the present disclosure.

The specific embodiments of the present disclosure do not constitute a limitation on a protection scope of the present disclosure. Any other corresponding change and deformation made according to a technical concept of the present disclosure should be included in the protection scope of claims of the present disclosure.

What is claimed is:
1. A heterodyne two-dimensional grating measuring device, comprising:
a light source;
a reading head;
a photoelectric receiving module; and
a processor;

wherein the light source is configured to generate two beams of linearly polarized light having characteristics of overlapping, polarization orthogonal, and fixed frequency difference;

the two beams of linearly polarized light are a first polarized light and a second polarized light, respectively;

the reading head is configured to receive the first polarized light and the second polarized light, the first polarized light and the second polarized light are respectively incident on a surface of a moving two-dimensional measuring grating to generate a first dimension ±1-order diffracted light and a second dimension ±1-order diffracted light, the first dimension ±1-order diffracted light and the second dimension ±1-order diffracted light are respectively incident to the photoelectric receiving module through the reading head;

the photoelectric receiving module is configured to generate beat frequency signals with respect to the first dimension ±1-order diffracted light and beat frequency signals with respect to the second dimension ±1-order diffracted light and send the beat frequency signals with respect to the first dimension ±1-order diffracted light and the beat frequency signals with respect to the second dimension ±1-order diffracted light to the processor; and the processor is configured to perform differential calculation on the beat frequency signals generated with respect to the first dimension ±1-order diffracted light and the beat frequency signals generated with respect to the second dimension ±1-order diffracted light to realize a displacement measurement of single diffraction of a first dimension and a second dimension of the two-dimensional measuring grating for four-fold optical subdivision.

2. The heterodyne two-dimensional grating measuring device according to claim 1, wherein the first polarized light is a first S polarized light having a frequency of $f_A$, and the second polarized light is a first P polarized light having a frequency of $f_B$; the reading head comprises a polarized beam splitting prism, a first quarter wave plate, a second quarter wave plate plated with a reflecting film, a third quarter wave plate, a reflecting prism, and a refracting prism; the reflecting film is plated on one surface, away from the polarized beam splitting prism, of the second quarter wave plate;

wherein the polarized beam splitting prism is configured to receive the first polarized light and the second polarized light, then transmit the second polarized light to the first quarter wave plate and reflect the first polarized light to the second quarter wave plate;

the first quarter wave plate is disposed on a transmission light path of the polarized beam splitting prism and is configured to convert the second polarized light into a first right-handed polarized light, then the first right-handed polarized light is incident to the reflecting prism;

the reflecting prism is disposed on a transmission light path of the first quarter wave plate and is configured to reflect the first right-handed polarized light; when the first right-handed polarized light passes through the first quarter wave plate and then converts into a second S polarized light, the second S polarized light returns to the polarized beam splitting prism;

the second quarter wave plate is disposed on a reflected light path of the polarized beam splitting prism and is configured to convert the first polarized light into a first left-handed polarized light when the first polarized light enters the second quarter wave plate; the first left-handed polarized light arrives the reflecting film, is reflected by the reflecting film, and returns to pass through the second quarter wave plate to convert into a second P polarized light, the second P polarized light returns to the polarized beam splitting prism;

the polarized beam splitting prism is further configured to transmit the second P polarized light and reflect the second S polarized light, so that the second P polarized light and the second S polarized light are combined into one beam to be incident to the third quarter wave plate; and the third quarter wave plate is disposed on a light path where the polarized beam splitting prism transmits the second P polarized light; the third quarter wave plate is configured to convert the second P polarized light into a second right-handed polarized light to be vertically incident on a surface of the two-dimensional measuring grating, and the third quarter wave plate is further configured to convert the second S polarized light into a second left-handed polarized light to be vertically incident on the surface of the two-dimensional measuring grating; and the second right-handed polarized light and the second left-handed polarized light are respectively diffracted to generate the first dimension ±1-order diffracted light and the second dimension ±1-order diffracted light.

3. The heterodyne two-dimensional grating measuring device according to claim 2, wherein the first dimension ±1-order diffracted light comprises a first dimension −1-order diffracted light and a first dimension +1-order diffracted light, the second dimension +1-order diffracted light comprises a second dimension −1-order diffracted light and a second dimension +1-order diffracted light; the first dimension −1-order diffracted light, the first dimension +1-order diffracted light, the second dimension −1-order diffracted light, and the second dimension +1-order diffracted light respectively comprise a first polarized light component and a second polarized light component.

4. The heterodyne two-dimensional grating measuring device according to claim 3, wherein the reading head comprises the refracting prism disposed on a diffracted light path of the two-dimensional measuring grating, the refracting prism is configured to refract the first dimension −1-order diffracted light, the first dimension +1-order diffracted light, the second dimension −1-order diffracted light, and the second dimension +1-order diffracted light, so that the first dimension −1-order diffracted light, the first dimension +1-order diffracted light, the second dimension −1-order diffracted light, and the second dimension +1-order diffracted light are paralleled and are vertically incident on the third quarter wave plate;

the third quarter wave plate is configured to convert the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light into a third S polarized light to be vertically incident to the polarized beam splitting prism, and the third quarter wave plate is further configured to convert the second polarized light component of the first dimension −1-order diffracted light, the second polarized light component of the first dimension +1-order diffracted light, the second polarized light component of the second dimension −1-order diffracted light, and the second polarized light component of the second dimension +1-order diffracted light into a third P polarized light to be vertically incident to the polarized beam splitting prism;

the polarized beam splitting prism is configured to reflect the third S polarized light to the first quarter wave plate, and the polarized beam splitting prism is further configured to transmit the third P polarized light to the second quarter wave plate;

the first quarter wave plate is configured to convert the third S polarized light into a third left-handed polarized light to be incident to the reflecting prism;

the reflecting prism is configured to respectively perform secondary reflection on the third left-handed polarized light to the first quarter wave plate to convert into a fourth P polarized light;

then the fourth P polarized light is incident to the polarized beam splitting prism and is transmitted to the photoelectric receiving module through the polarized beam splitting prism; and the second quarter wave plate is configured to convert the third P polarized light into a third right-handed polarized light when the third P polarized light enters the second quarter wave plate; the third right-handed polarized light arrives the reflecting film and is reflected by the reflecting film to return to pass through the second quarter wave plate to convert into a fourth S polarized light; then the fourth S polarized light returns to the polarized beam splitting prism and is reflected to the photoelectric receiving module through the polarized beam splitting prism.

5. The heterodyne two-dimensional grating measuring device according to claim 4, wherein the photoelectric receiving module comprises a first receiver, a second receiver, a third receiver, and a fourth receiver;

the first receiver is configured to receive the fourth P polarized light corresponding to the first polarized light component of the first dimension +1-order diffracted light and the fourth S polarized light corresponding to the second polarized light component of the first dimension −1-order diffracted light, generate a beat frequency signal having a frequency of $f_B-f_A$, and send the beat frequency signal having the frequency of $f_B-f_A$ to the processor;

the second receiver is configured to receive the fourth P polarized light corresponding to the first polarized light component of the first dimension −1-order diffracted light and the fourth P polarized light corresponding to the second polarized light component of the first dimension +1-order diffracted light, generate a beat frequency signal having a frequency of $f_B-f_A$, and send the beat frequency signal having the frequency of $f_B-f_A$ to the processor;

the third receiver is configured to receive the fourth P polarized light corresponding to the first polarized light component of the second dimension +1-order diffracted light and the fourth S polarized light corresponding to the second polarized light component of the second dimension −1-order diffracted light, generate a beat frequency signal having a frequency of $f_B-f_A$, and send the beat frequency signal having the frequency of $f_B-f_A$ to the processor; and the fourth receiver is configured to receive the first polarized light component of the second dimension −1-order diffracted light and the second polarized light component of the second dimension +1-order diffracted light, generate a beat frequency signal having a frequency of $f_B-f_A$, and send the beat frequency signal having the frequency of $f_B-f_A$ to the processor.

6. The heterodyne two-dimensional grating measuring device according to claim 5, wherein the first polarized light component and the second polarized light component received by the first receiver, the first polarized light component and the second polarized light component received by the second receiver, the first polarized light component and the second polarized light component received by the third receiver, and the first polarized light component and the second polarized light component received by the fourth receiver respectively pass through the reflecting prism twice, and optical path lengths of different first polarized light component and second polarized light component in the reading head are equal.

7. The heterodyne two-dimensional grating measuring device according to claim 5, wherein when the two-dimensional measuring grating moves along a direction of a first dimension grating vector, the first dimension −1-order diffracted light undergoes negative frequency shift $-\Delta f$, the first dimension +1-order diffracted light undergoes forward frequency shift $+\Delta f$, the frequency of the beat frequency signal generated by the first receiver becomes $f_B-f_A-2\Delta f$, and the frequency of the beat frequency signal generated by the second receiver becomes $f_B-f_A+2\Delta f$, and when the two-dimensional measuring grating moves along a direction of a second dimension grating vector, the second dimension −1-order diffracted light undergoes negative frequency shift $-\Delta f$, the second dimension +1-order diffracted light undergoes forward frequency shift $+\Delta f$, the frequency of the beat frequency signal generated by the third receiver becomes $f_B-f_A-2\Delta f$, and the frequency of the beat frequency signal generated by the fourth receiver becomes $f_B-f_A+2\Delta f$.

8. The heterodyne two-dimensional grating measuring device according to claim 7, wherein the processor is configured to perform the differential calculation on the beat frequency signal generated by the first receiver and the beat frequency signal generated by the second receiver to realize the displacement measurement of the single diffraction of the first dimension of the two-dimensional measuring grating for the four-fold optical subdivision; and the processor is further configured to perform the differential calculation on the beat frequency signal generated by the third receiver and the beat frequency signal generated by the fourth receiver to realize the displacement measurement of the single diffraction of the second dimension of the two-dimensional measuring grating for the four-fold optical subdivision.

9. A heterodyne two-dimensional grating measuring method, comprising following steps:

S1: generating two beams of linearly polarized light having characteristics of overlapping, polarization orthogonal, and fixed frequency difference through a light source, where the two beams of the linearly polarized light are respectively a first polarized light having a frequency of $f_A$ and a second polarized light having a frequency of $f_B$, the first polarized light is a first S polarized light, and the second polarized light is a first P polarized light;

S2: respectively entering the first polarized light and the second polarized light into a reading head, reflecting and transmitting the first polarized light and the second polarized light through the reading head, and respectively incidenting the first polarized light and the second polarized light on a surface of a moving two-dimensional measuring grating to generate a first dimension ±1-order diffracted light and a second dimension ±1-order diffracted light; then respectively incidenting the first dimension ±1-order diffracted light and the second dimension ±1-order diffracted light to a photoelectric receiving module through the reading head;

S3: generating a beat frequency signal with respect to the first dimension ±1-order diffracted light and a beat frequency signal with respect to the second dimension ±1-order diffracted light through the photoelectric receiving module, and sending the beat frequency signal with respect to the first dimension ±1-order diffracted light and the beat frequency signal with respect to the second dimension ±1-order diffracted light to a processor;

S4: performing differential calculation on the beat frequency signal generated with respect to the first dimension ±1-order diffracted light and the beat frequency signal generated with respect to the second dimension ±1-order diffracted light to realize a displacement measurement of single diffraction of a first dimension and a second dimension of the two-dimensional measuring grating for four-fold optical subdivision.

10. The heterodyne two-dimensional grating measuring method according to claim 9, wherein the step S2 comprises the following steps:

S201: reflecting the first polarized light to a second quarter wave plate through a polarized beam splitting prism, converting the first polarized light into a first left-handed polarized light by the second quarter wave plate, reflecting the first left-handed polarized light to return and pass through the second quarter wave plate to convert into a second P polarized light, and then returning the second P polarized light to the polarized beam splitting prism; and transmitting the second polarized light to a first quarter wave plate through the polarized beam splitting prism, converting the second polarized light into a first right-handed polarized light, incidenting the first right-handed polarized light into the reflecting prism, reflecting the first right-handed polarized light through the reflecting prism, returning the first right-handed polarized light to the polarized beam splitting prism after the first right-handed polarized light passes through the first quarter wave plate and converts into a second S polarized light; and S202: transmitting the second P polarized light through the polarized beam splitting prism, reflecting the second S polarized light through the polarized beam splitting prism, so that the second P polarized light and the second S polarized light are combined into one beam to be incident to a third quarter wave plate; converting the second P polarized light into a second right-handed polarized light through the third quarter wave plate, vertically incidenting the second right-handed polarized light on a surface of the two-dimensional measuring grating, and converting the second S polarized light into a second left-handed polarized light through the third quarter wave plate, vertically incidenting the second left-handed polarized light on the surface of the two-dimensional measuring grating; and respectively diffracting the second right-handed polarized light and the second left-handed polarized light to generate the first dimension ±1-order diffracted light and the second dimension ±1-order diffracted light.

11. The heterodyne two-dimensional grating measuring method according to claim 10, wherein the first dimension ±1-order diffracted light comprises a first dimension −1-order diffracted light and a first dimension ±1-order diffracted light, the second dimension ±1-order diffracted light comprises a second dimension −1-order diffracted light and a second dimension +1-order diffracted light; the first dimension −1-order diffracted light, the first dimension +1-order diffracted light, the second dimension −1-order diffracted light, and the second dimension +1-order diffracted light respectively comprise a first polarized light component and a second polarized light component.

12. The heterodyne two-dimensional grating measuring method according to claim 11, comprising following steps after the S202:

S203: refracting the first dimension −1-order diffracted light, the first dimension +1-order diffracted light, the second dimension −1-order diffracted light, and the second +1-order diffracted light through a refracting prism to be parallel and be vertically incident to the third quarter wave plate;

S204: converting the first polarized light component of the first dimension −1-order diffracted light, the first polarized light component of the first dimension +1-order diffracted light, the first polarized light component of the second dimension −1-order diffracted light, and the first polarized light component of the second dimension +1-order diffracted light into a third S polarized light through the third quarter wave plate to be vertically incident to the polarized beam splitting prism; and converting the second polarized light component of the first dimension −1-order diffracted light, the second polarized light component of the first dimension +1-order diffracted light, the second polarized light component of the second dimension −1-order diffracted light, and the second polarized light component of the second dimension +1-order diffracted light into a third P polarized light through the third quarter wave plate to be vertically incident to the polarized beam splitting prism;

S205: reflecting the third S polarized light splitting prism; and transmitting the third P polarized light to the second quarter wave plate through the polarized beam splitting prism;

S206: converting the third P polarized light into a third right-handed polarized light through the second quarter wave plate, reflecting the third right-handed polarized light to pass through the second quarter wave plate to convert into a fourth S polarized light; incidenting the fourth S polarized light to the polarized beam splitting prism and reflecting the fourth S polarized light to the photoelectric receiving module through the polarized beam splitting prism; converting the third S polarized light into a third left-handed polarized light through the first quarter wave plate to be incident to the reflecting prism; respectively performing secondary reflection on the first third left-handed polarized light to the first quarter wave plate through the reflecting prism to convert into a fourth P polarized light; then incidenting the fourth P polarized light to the polarized beam splitting prism and transmitting the fourth P polarized light to the photoelectric receiving module through the polarized beam splitting prism.

13. The heterodyne two-dimensional grating measuring method according to claim 12, wherein the photoelectric receiving module comprises a first receiver, a second receiver, a third receiver, and a fourth receiver;

the first receiver is configured to receive the fourth P polarized light corresponding to the first polarized light component of the first dimension +1-order diffracted light and the fourth S polarized light corresponding to the second polarized light component of the first dimension −1-order diffracted light, generate a beat frequency signal having a frequency of $f_B$-$f_A$, and send the beat frequency signal having the frequency of $f_B$-$f_A$ to the processor;

the second receiver is configured to receive the fourth P polarized light corresponding to the first polarized light component of the first dimension −1-order diffracted light and the fourth S polarized light corresponding to the second polarized light component of the first dimension +1-order diffracted light, generate a beat frequency signal having a frequency of f-$f_A$, and send the beat frequency signal having the frequency of $f_B$-$f_A$ to the processor;

the third receiver is configured to receive the fourth P polarized light corresponding to the first polarized light component of the second dimension +1-order diffracted light and the fourth S polarized light corresponding to the second polarized light component of the second dimension −1-order diffracted light, generate a beat frequency signal having a frequency of $f_B$-$f_A$, and send the beat frequency signal having the frequency of $f_B$-$f_A$ to the processor; and the fourth receiver is configured to receive the fourth P polarized light corresponding to the first polarized light component of the second dimension −1-order diffracted light and the fourth S polarized light corresponding to the second polarized light component of the second dimension +1-order diffracted light, generate a beat frequency signal having a frequency of $f_B$-$f_A$, and send the beat frequency signal having the frequency of $f_B$-$f_A$ to the processor.

14. The heterodyne two-dimensional grating measuring method according to claim 13, wherein the first polarized light component and the second polarized light component received by the first receiver, the first polarized light component and the second polarized light component received by the second receiver, the first polarized light component and the second polarized light component received by the third receiver, and the first polarized light component and the second polarized light component received by the fourth receiver respectively pass through the reflecting prism twice, and optical path lengths of different first polarized light component and second polarized light component in the reading head are equal.

15. The heterodyne two-dimensional grating measuring method according to claim 13, wherein when the two-dimensional measuring grating moves along a direction of a first dimension grating vector, the first dimension −1-order diffracted light undergoes negative frequency shift −Δf, the first dimension +1-order diffracted light undergoes forward frequency shift +Δf, the frequency of the beat frequency signal generated by the first receiver becomes $f_B$-$f_A$−2Δf, and the frequency of the beat frequency signal generated by the second receiver becomes $f_B$-$f_A$+2Δf, and when the two-dimensional measuring grating moves along a direction of a second dimension grating vector, the second dimension −1-order diffracted light undergoes negative frequency shift −Δf, the second dimension +1-order diffracted light undergoes forward frequency shift +Δf, the frequency of the beat frequency signal generated by the third receiver becomes $f_B$-$f_A$−2Δf, and the frequency of the beat frequency signal generated by the fourth receiver becomes $f_B$-$f_A$+2Δf.

16. The heterodyne two-dimensional grating measuring method according to claim 15, wherein the processor is configured to perform the differential calculation on the beat frequency signal generated by the first receiver and the beat frequency signal generated by the second receiver to realize the displacement measurement of the single diffraction of the first dimension of the two-dimensional measuring grating for the four-fold optical subdivision; and the processor is further configured to perform the differential calculation on the beat frequency signal generated by the third receiver and the beat frequency signal generated by the fourth receiver to realize the displacement measurement of the single diffraction of the second dimension of the two-dimensional measuring grating for the four-fold optical subdivision.

\* \* \* \* \*